US007593829B2

(12) United States Patent
White

(10) Patent No.: US 7,593,829 B2

(45) Date of Patent: Sep. 22, 2009

(54) METHOD FOR GENERATING PSEUDO-RANDOM PATTERN DESIGNS FOR OPTICAL POSITION DETERMINATION SYSTEMS

(75) Inventor: John S. White, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/749,312

(22) Filed: May 16, 2007

(65) Prior Publication Data

US 2008/0288207 A1 Nov. 20, 2008

(51) Int. Cl.
*G01C 9/00* (2006.01)
*H04N 1/40* (2006.01)

(52) U.S. Cl. ........................ 702/150; 702/152; 358/1.9; 358/3.1

(58) Field of Classification Search ....................... None
See application file for complete search history.

(56) References Cited

U.S. PATENT DOCUMENTS

| | | | | |
|---|---|---|---|---|
| 6,099,134 | A * | 8/2000 | Taniguchi et al. | 362/618 |
| 6,789,042 | B2 * | 9/2004 | Boyton | 702/150 |
| 2004/0239844 | A1 * | 12/2004 | Kanoh et al. | 349/113 |
| 2005/0264834 | A1 * | 12/2005 | Asai et al. | 358/1.9 |
| 2006/0058978 | A1 | 3/2006 | Kurth et al. | |
| 2008/0144111 | A1 * | 6/2008 | Lee et al. | 358/3.1 |

* cited by examiner

*Primary Examiner*—Bryan Bui
*Assistant Examiner*—Jonathan Teixeira Moffat
(74) *Attorney, Agent, or Firm*—Fogg & Powers LLC

(57) ABSTRACT

A method for generating a pseudo-random pattern of dots to be patterned on a surface including the steps of receiving surface input parameters for the surface, selecting dot locations for the pseudo-random pattern of dots for at least a portion of the surface based on the surface input parameters, and outputting coordinates for dot centers based on the dot locations.

20 Claims, 6 Drawing Sheets

210
225
215
225
226
231
230
231A
226D
230A
225A
226A
226B
226C

METHOD FOR GENERATING PSEUDO-RANDOM PATTERN DESIGNS FOR OPTICAL POSITION DETERMINATION SYSTEMS

CROSS REFERENCE TO RELATED APPLICATIONS

This application is related to U.S. patent application Ser. No. 11/749,309 having a title of "METHOD AND SYSTEM FOR DETERMINING ANGULAR POSITION OF AN OBJECT" (also referred to here as the "'309 Application") filed on the same date herewith. The '309 Application is hereby incorporated herein by reference.

BACKGROUND

Precision inertial navigation systems can eliminate the need for gimbals by supporting the inertial sensor assembly with a spherically shaped gas supported bearing. During the flight of a craft, the angular position of the inertial sensor assembly (sometimes also referred to as the attitude, or roll, pitch and yaw of the inertial sensor assembly) relative to the frame of the craft must be monitored at all times by an optical imaging system that images a reference surface pattern on the surface of the spherically shaped gas supported bearing. The gas supported bearing allows rotation of the inertial sensor assembly in all axes without physical contact between an optical sensor in the optical imaging system and the assembly.

The optical sensor in the optical imaging system of such a precision inertial navigation system generates image signals of at least a portion of a reference surface pattern on the surface of the spherically shaped gas supported bearing. When an area of the reference surface pattern on the surface of the bearing is imaged, the location of the imaged area is determined by comparing the imaged area with a map of the pattern on the surface of the object. The inertial navigation system determines the rotation of the imaged area by comparing the angle of the pattern of the imaged area with a map of the pattern on the surface of the object. In this manner, the angular position of a rotating object is disclosed.

In other applications, an optical sensor in the optical imaging system is used to image the surface pattern that is patterned on the surface of objects that are moved through the line of sight of the optical sensor. For example, in a manufacturing assembly line, objects may be scanned to determine a position of the object, and a robotic system down-line from the optical imaging system and in communication with the optical imaging system is implemented to reposition the object if necessary.

The reference surface pattern is typically an array of symbols or shapes that are on the surface of the gas supported bearing or other object. The number of shapes and complexity of the shapes that are patterned on the surface of the spherically shaped gas supported bearing constrain the accuracy of the reading of the optical sensor and ultimately, of the inertial navigation system. The number of shapes and complexity of the shapes that are patterned on the surface of the assembly line objects constrain the accuracy of the reading of the optical sensor and ultimately, of the position of the object in the assembly line.

SUMMARY

In one embodiment, a method for generating a pseudo-random pattern of dots to be patterned on a surface comprising the steps of receiving surface input parameters for the surface, selecting dot locations for the pseudo-random pattern of dots for at least a portion of the surface based on the surface input parameters, and outputting coordinates for dot centers based on the dot locations.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
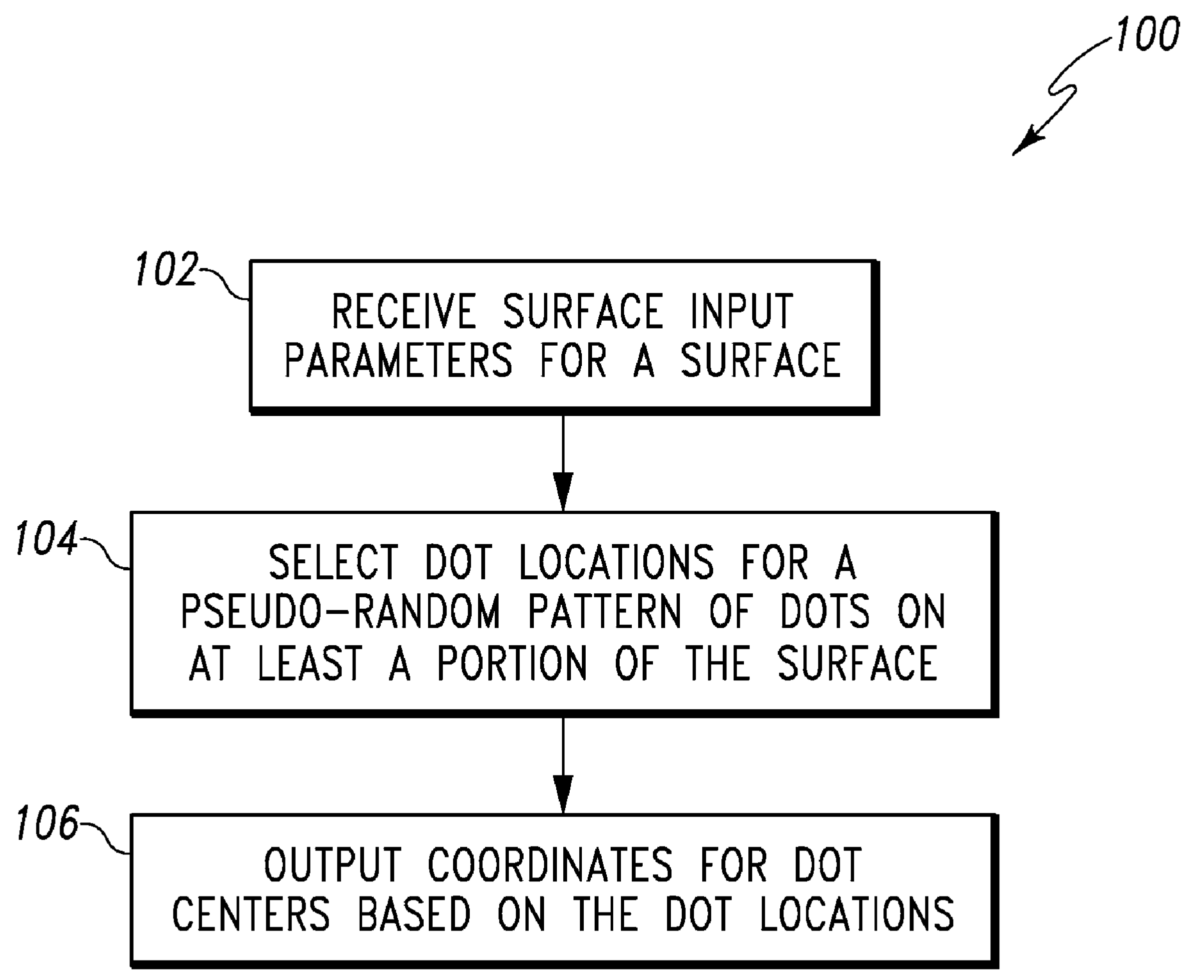
FIG. 1 is a flow diagram of one embodiment of a method for generating a pseudo-random pattern of dots to be patterned on a surface in accordance with the present invention.

FIG. 1 is a flow diagram of one embodiment of a method 100 for generating a pseudo-random pattern of dots to be patterned on a surface in accordance with the present invention.

Figure 2:
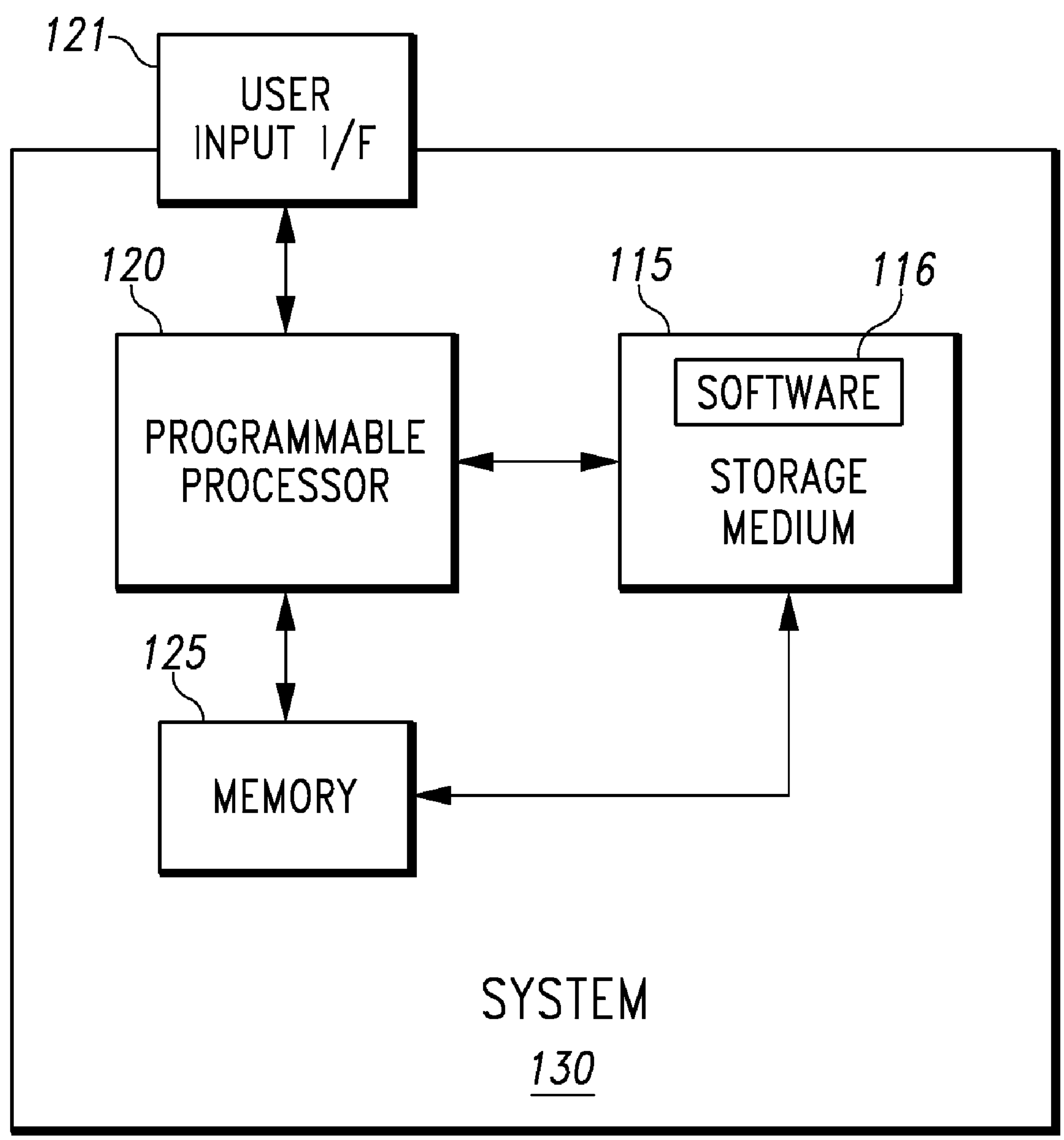
FIG. 2 is a pictorial diagram of a system comprising storage medium to cause a programmable processor to generate a pseudo-random pattern of dots.

At step 102, surface input parameters for a surface are received. In one implementation of this embodiment, the surface input parameters for a surface are received at a programmable processor. FIG. 2 is a pictorial diagram of a system comprising storage medium to cause a programmable processor to generate a pseudo-random pattern of dots. In the embodiment shown in FIG. 2, a system 130 includes a programmable processor 120 that receives the surface input parameters for the surface. The details for receiving surface input parameters are described below with reference to method 300 of FIG. 3.

Returning to method 100, at step 104, dot locations are selected for a pseudo-random pattern of dots on at least a portion of the surface. The selection of dot locations is based on the surface input parameters. In an embodiment shown in FIG. 2, the system 130 includes a programmable processor 120, which executes a program product, such as software 116 that is embodied on a storage medium 115, to select the dot locations for the pseudo-random pattern of dots to be patterned on the surface. As defined herein, the term pseudo-random pattern is a pattern that incorporates a randomness that overlays a systematic (non-random) structure. The details for selecting the dot locations in a pseudo-random pattern are described below with reference to method 400 of FIG. 4.

At step 106, coordinates for dot centers are output based on the dot locations. In one implementation of this embodiment, the programmable processor 120 outputs the coordinates for the dot centers. As shown in FIG. 2, a memory 125 is communicatively coupled to the storage medium 115 and the programmable processor 120. The coordinates for dot centers may be stored in memory 125 by programmable processor 120. When dots are placed at the coordinates for dot centers on the surface having a shape defined by the surface input parameters, the dots form a pseudo-random pattern on the at least a portion of the surface.

Figure 3:
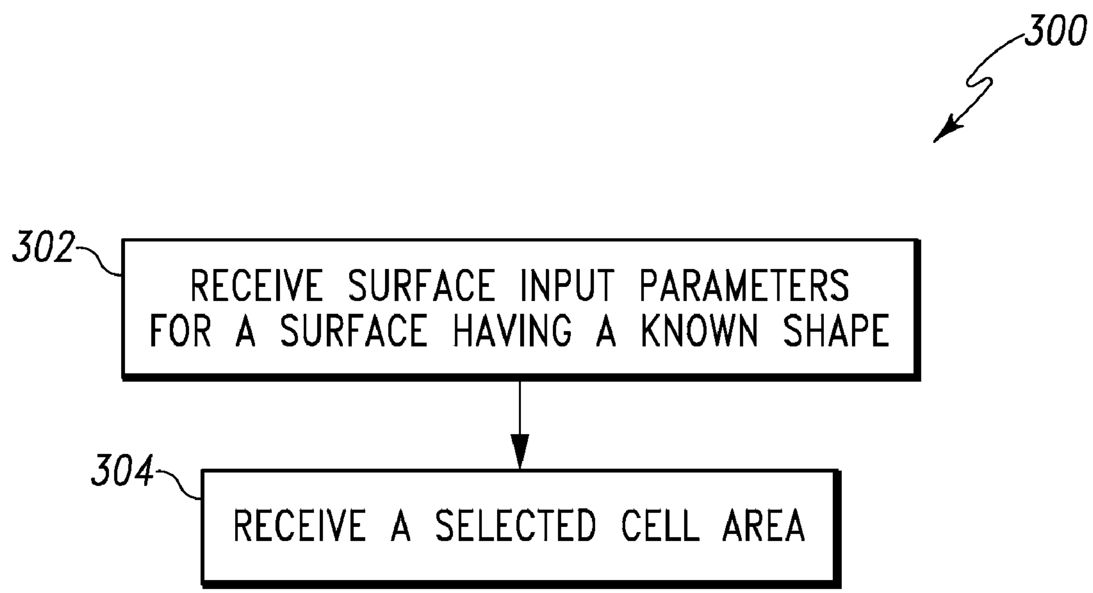
FIG. 3 is a flow diagram of one embodiment of a method for receiving surface input parameters in accordance with the present invention.

FIG. 3 is a flow diagram of one embodiment of a method 300 for receiving surface input parameters in accordance with the present invention. In some implementations of this embodiment, the method 300 is implemented by the system 130 of FIG. 2.

At step 302, surface input parameters are received for a surface having a known shape. The surface input parameters mathematically describe the known shape with reference to a known coordinate system. In one implementation of this embodiment, the programmable processor 120 receives the surface input parameters from a user via a user input interface 121 to the system 130.

In one implementation of this embodiment, the known shape is a sphere. In this case, the programmable processor 120 receives surface input parameters for a spherical surface. At least a portion of the surface input parameters for the spherical surface includes a radius of the spherical surface.

In another implementation of this embodiment, the known shape is a cylindrical surface. In this case, the programmable processor 120 receives surface input parameters for a cylindrical surface. At least a portion of the surface input parameters includes a radius of the cylindrical surface and a length of the cylindrical surface.

In yet another implementation of this embodiment, the known shape is a flat surface. In this case, the programmable processor 120 receives surface input parameters for a flat surface. At least a portion of the surface input parameters includes at least one length of the flat surface, at least one width of the flat surface, a perpendicular distance from a center to a side, and/or a distance from a center to a vertex. If the flat surface is rectangular, only one length, and one width are required. If the flat surface is a polygon, then the lengths of the edges of the polygon, a perpendicular distance from a center to a side, and/or a distance from a center to a vertex are required.

In yet another implementation of this embodiment, the known shape is a combination of at least two of a spherical surface, a cylindrical surface, and a flat surface. In this case, the programmable processor 120 receives surface input parameters that include at least two of a radius of the spherical surface, a radius of the cylindrical surface, a length of the cylindrical surface, at least one length of the flat surface, at least one width of the flat surface, a perpendicular distance from a center to a side, and/or a distance from a center to a vertex. In one implementation of this embodiment, the programmable processor 120 receives surface input parameters that mathematically describe the surfaces that conjoin unlike-surface shapes with reference to a known coordinate system.

At step 304, a selected cell area is received. In one implementation of this embodiment, the programmable processor 120 receives the selected cell area from a user via the user input interface 121. In one implementation of this embodiment, the selected cell area is 0.125 square inches for a sphere having a radius of 5 inches.

Figure 4:
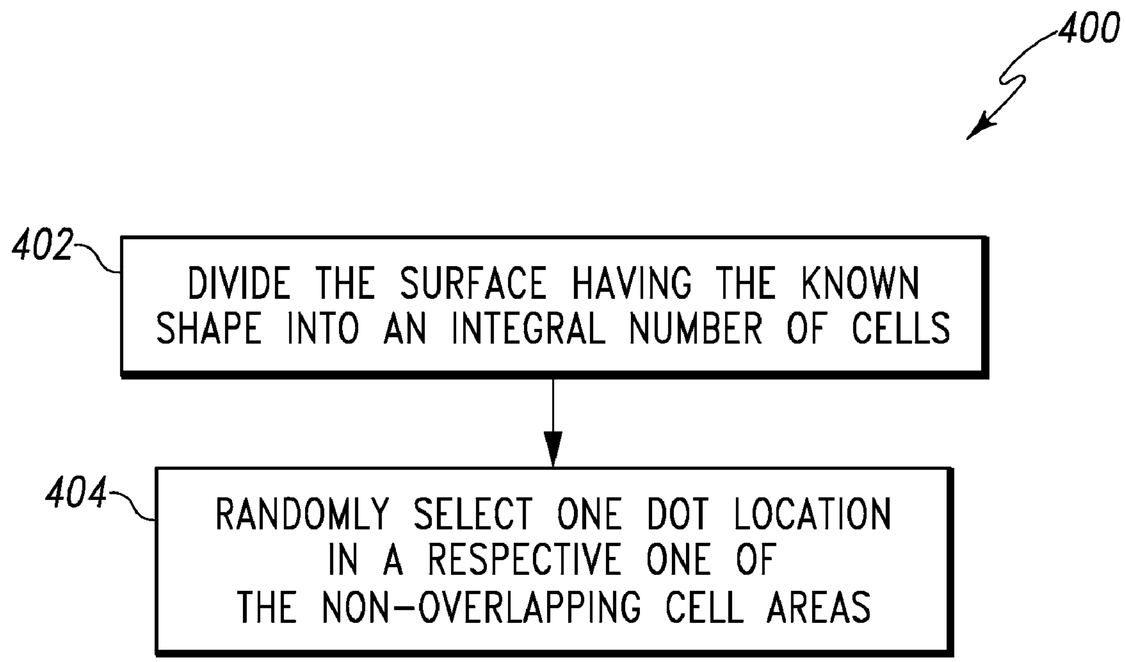
FIG. 4 is a flow diagram of one embodiment of a method for selecting dot locations in accordance with the present invention.

FIG. 4 is a flow diagram of one embodiment of a method 400 for selecting dot locations in accordance with the present invention. In some implementations of this embodiment, the method 300 is implemented by the system 130 of FIG. 2.

At step 402, the surface having the known shape is divided into an integral number of cells, each cell including a non-overlapping cell area approximately equal to the selected cell area.

In an implementation in which the known shape is a spherical shape, a tessellation approximation is performed for the spherical surface to divide the spherical surface area into an integral number of cells, each cell including a non-overlapping cell area approximately equal to the selected cell area. In an implementation in which the known shape is a cylindrical shape, the cylindrical surface is divided into an integral number of cells, each cell including a non-overlapping cell area approximately equal to the selected cell area. In an implementation in which the known shape is a flat surface, the flat surface is divided into an integral number of cells, each cell including a non-overlapping cell area approximately equal to the selected cell area.

At step 404, one dot location is randomly selected in a respective one of the non-overlapping cell areas. In one implementation of this embodiment, a dot location is randomly selected for only a portion of the cells into which the known shape has been divided. In another implementation of this embodiment, a dot location is randomly selected for each one of the cells into which the known shape has been divided. Since the cell distribution is systematic (not random) and the dot position within the cell is random, the dot locations are in a pseudo-random pattern. As described above with reference to step 106 of method 100 in FIG. 1, when dots are placed at the output coordinates for dot centers on the surface of an object that has the known shape, the dots form a pseudo-random pattern on the surface of the object. If the dots' locations were selected for only a portion of the surface, when dots are placed at the output coordinates for dot centers on the surface of an object having the known shape, the dots form a pseudo-random pattern on those portions of the surface of the object for which dot location have been selected. In one implementation of this embodiment, the minimum dot density is controlled to be at least 3 per field of view area for an imaging system in which the sphere is to be imaged.

Figure 5A:
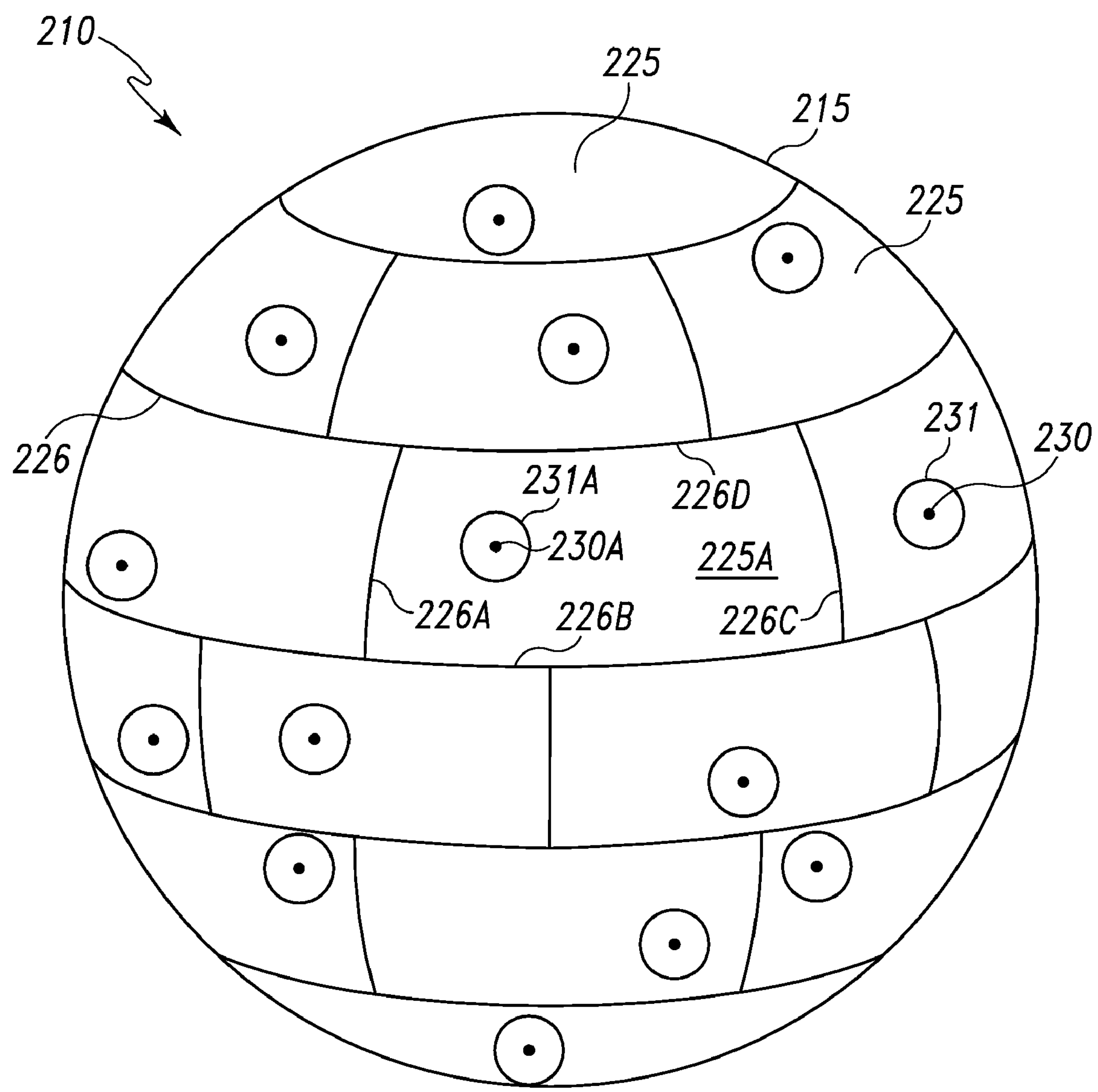
FIGS. 5A and 5B are pictorial diagrams of a spherical surface including an integral number of cells upon which a pseudo-random pattern of dots has been patterned.
Figure 5B:
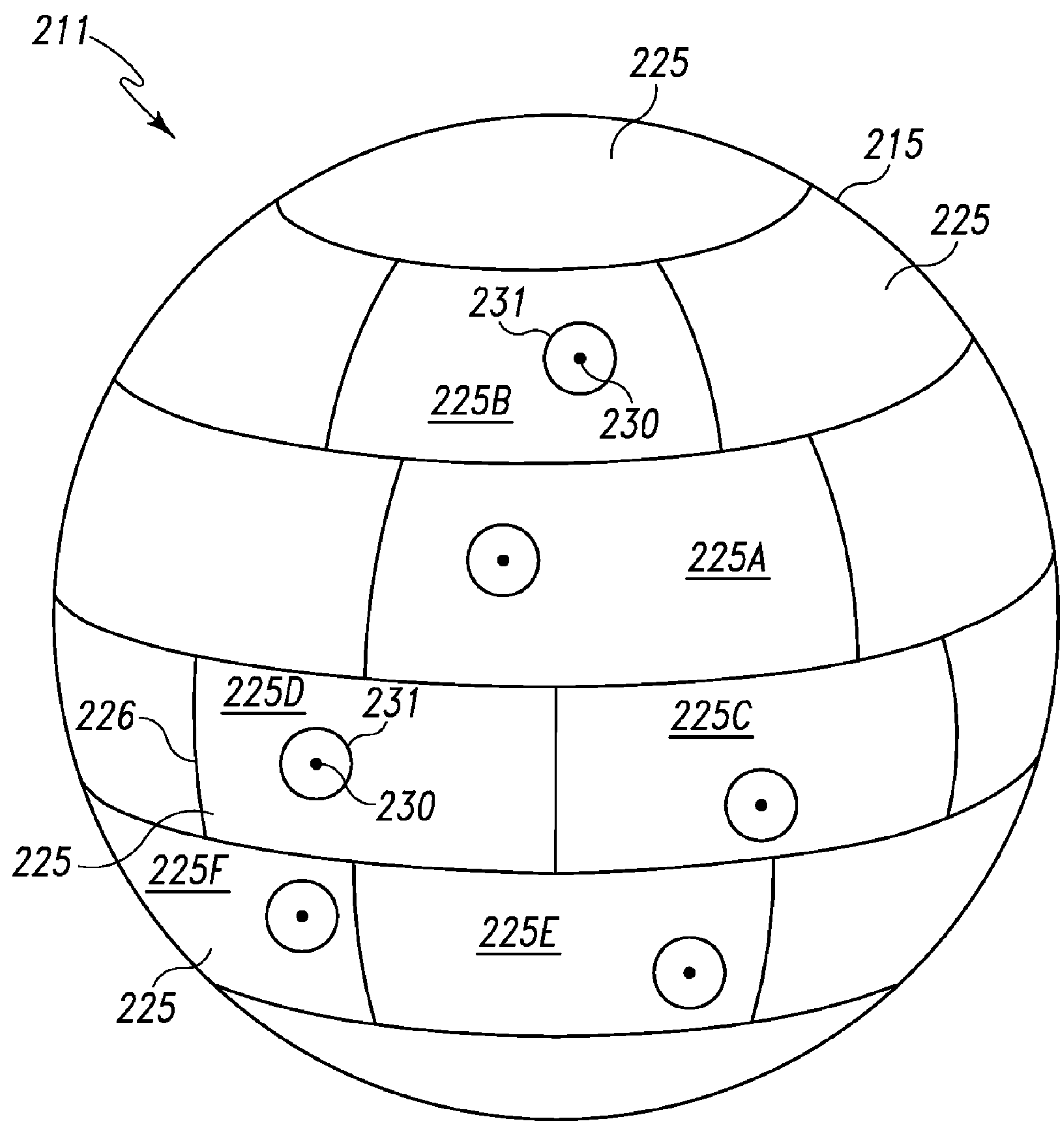

FIGS. 5A and 5B are pictorial diagrams of a spherical surface including an integral number of cells upon which a pseudo-random pattern of dots has been patterned. FIG. 5A is a pictorial diagram of a sphere 210 having a spherical surface 215 that is divided into an integral number of cells represented generally by the numeral 225. A pseudo-random pattern of dots represented generally by the numeral 231 has been patterned over the whole spherical surface 215. The spherical surface 215 is mathematically described as $4\pi r^2$, where r is the radius of the sphere 210. In one implementation of this embodiment, the known coordinate system for the sphere 210 is a polar coordinate system having an origin located within the center of the sphere 210. Each dot 231 is centered on a dot center 230. The dot center 230 is a point in space on the spherical surface 215. As shown in FIG. 5A, there is one dot center 230 located in each cell 225. Each dot center 230 is a point within the dot 231. The location of each dot center 230 on the surface 215 of the sphere can be mathematically described. For example, the dot center 230 can be described by polar coordinates using the polar coordinate system having an origin located within the center of the sphere 210. A dot 231 can be marked on the spherical surface 215, for example, by dropping an ink dot from an ink jet nozzle, at each of the mathematically described dot centers 230.

Each cell 225 includes a non-overlapping cell area that includes the area bounded by the cell edges represented generally by the numeral 226. For example, cell 225A, shown centered in the view of the sphere 210 of FIG. 5, is bounded by edges 226 (A-D). The length of edge 226A and the length of edge 226C are approximately equal. Likewise, the length of edge 226B and the length of edge 226D are approximately equal. Thus, the cell area is approximately the product of the length of edge 226A and the length of edge 226B.

FIG. 5B is a pictorial diagram of a sphere 211 having a spherical surface 215 that is divided into an integral number of cells 225. The spherical surface 215 is mathematically described as $4\pi r^2$, where r is the radius of the sphere 211. A pseudo-random pattern of dots 231 having dot centers 230 has been patterned over a portion of the spherical surface 215. As shown in FIG. 5B, the cells 225(A-F) are the portion of cells that includes a dot 231. A dot 231 can be marked on the spherical surface 215, for example, by dropping an ink dot from an ink jet nozzle, at each of the mathematically described dot centers 230 in the portion of cells 225 (A-F).

In one implementation of this embodiment, the sphere 210 is a gas supported bearing for use in an inertial sensor assembly that is monitored by an optical imaging system that images the pseudo-random pattern on the surface 215 of the sphere 210. In another implementation of this embodiment, the sphere 211 is a gas supported bearing for use in an inertial sensor assembly that is monitored by an optical imaging system that images the pseudo-random pattern on the surface 215 of the sphere 211.

Figure 6:
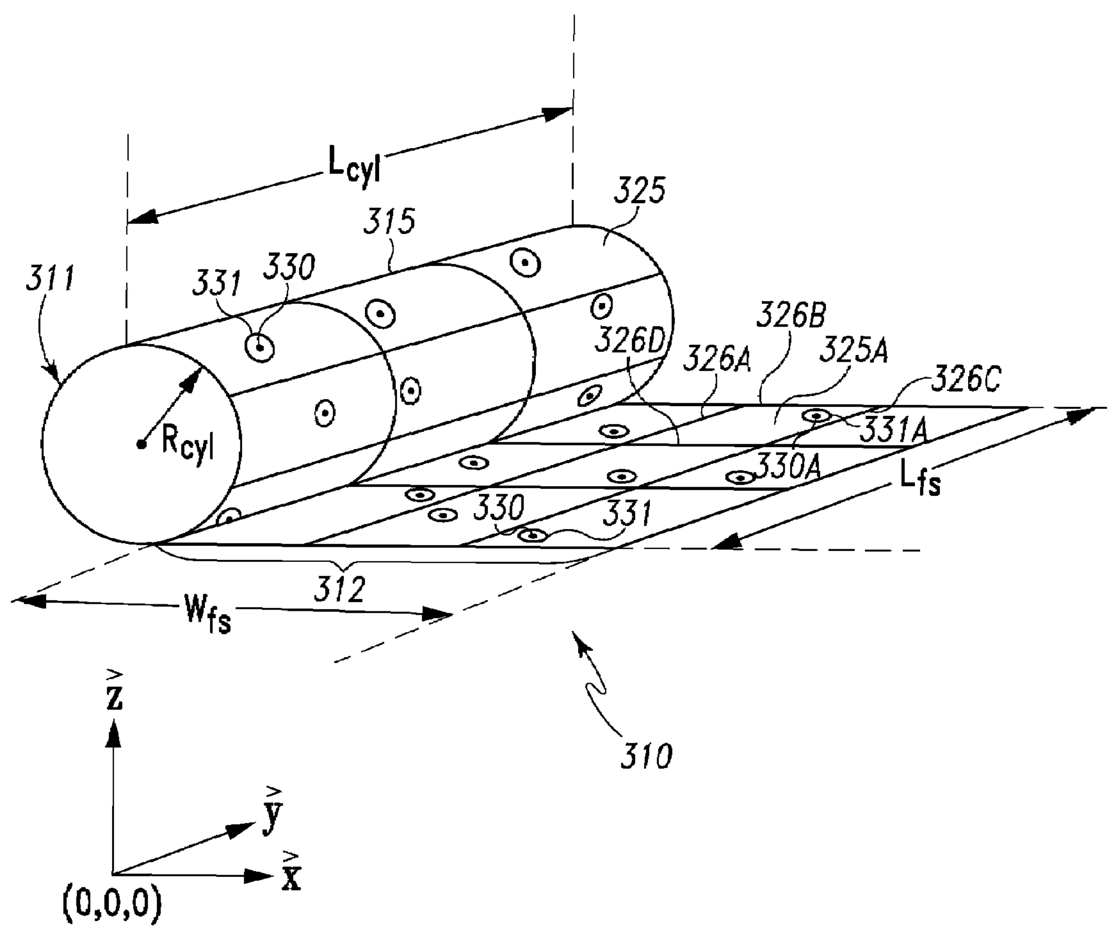
FIG. 6 is a pictorial diagram of an object that has a complex surface including an integral number of cells upon which a pseudo-random pattern of dots has been patterned.

FIG. 6 is a pictorial diagram of an object 310 that has a complex surface 315 including an integral number of cells represented generally by the numeral 325 upon which a pseudo-random pattern of dots represented generally by the numeral 331 has been patterned. Each dot 331 is centered on a dot center 330. The dot center 330 is a point in space on the complex surface 315 of object 310 that is referenced to the three dimensional coordinate space shown by the X, Y, and Z vectors at the origin (0, 0, 0) that form a basis for the three dimensional space. As shown in FIG. 6, the complex surface 315 includes a cylindrical surface 311 conjoined to a flat surface 312. The flat surface 312 is rectangularly shaped and is mathematically described by a length $L_{fs}$ and a width $W_{fs}$. The cylindrical surface 311 is mathematically described by a radius $R_{cyl}$ and a length $L_{cyl}$, which is equal to the length, $L_{fs}$.

Each cell 325 includes a non-overlapping cell area that includes the area bounded by the cell edges represented generally by the numeral 326. For example, cell 325A, shown at the far edge of the flat surface 312 in FIG. 6, is bounded by edges 326 (A-D). The length of edge 326A and the length of edge 326C are approximately equal. Likewise, the length of edge 326B and the length of edge 326D are approximately equal. Thus, the cell area of the cell 325A and all the other cells 325 on the complex surface 315 encompass a surface area or cell area that is approximately the product of the length of edge 326A and the length of edge 326B.

As shown in FIG. 6, there is one dot center 330 located in each cell 325. The location of each dot center 330 on the complex surface 315 can be mathematically described with reference to the X, Y, Z coordinate system. A dot 331 can be marked on the complex surface 315, for example, by dropping an ink dot from an ink jet nozzle, at each of the mathematically described dot centers 330.

In one implementation of this embodiment, the dots 331 are only marked on the complex surface 315 in a portion of the cells 325. In another implementation of this embodiment, the object 310 that has a complex surface 315 is an object in an assembly line that is monitored by an optical imaging system that images the pseudo-random pattern on the complex surface 315.

An exemplary set of software instructions that can be used for selecting dot locations for a pseudo-random pattern of dots on a spherical surface is shown in the appendix following the abstract.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for generating a pseudo-random pattern of dots to be patterned on a surface, the method comprising the steps of:

Receiving surface input parameters for the surface having a known shape including at least one curved surface at a programmable processor, wherein the surface input parameters mathematically describe the known shape with reference to a known coordinate system;

Selecting dot locations for the pseudo-random pattern of dots for at least a portion of the surface based on the surface input parameters by executing software at the programmable processor, wherein the pseudo-random pattern is a pattern that incorporates a randomness that overlays a systematic structure, wherein non-overlapping cell areas completely cover the surface, wherein one dot location is randomly selected anywhere within a respective one of at least a portion of the non-overlapping cell areas, so that there is no more than one dot patterned in any one of said portion of non-overlapping cell areas; and outputting coordinates for dot centers based on the dot locations from the programmable processor.

2. The method of claim 1, wherein the step of receiving surface input parameters comprises:

receiving surface input parameters for a spherical surface, wherein at least a portion of the surface input parameters includes a radius of the spherical surface; and receiving a selected cell area.

3. The method of claim 2, wherein the step of selecting dot locations comprises:

performing a tessellation approximation for the spherical surface to divide the spherical surface area into an integral number of cells, each cell including a non-overlapping cell area approximately equal to the selected cell area; and for at least a portion of the cells, randomly selecting one dot location in a respective one of the non-overlapping cell areas to generate the pseudo-random pattern of dots for at least a portion of the spherical surface based on the surface input parameters.

4. The method of claim 1, wherein the step of receiving surface input parameters comprises:

receiving surface input parameters for a cylindrical surface, wherein at least a portion of the surface input parameters includes a radius of the cylindrical surface and a length of the cylindrical surface; and receiving a selected cell area.

5. The method of claim 4, wherein the step of selecting dot locations comprises:

dividing the cylindrical surface into an integral number of cells, each cell including a non-overlapping cell area approximately equal to the selected cell area; and for at least a portion of the cells, randomly selecting one dot location in a respective one of the non-overlapping cell areas to generate the pseudo-random pattern of dots for at least a portion of the cylindrical surface based on the surface input parameters.

6. The method of claim 1, wherein the step of receiving surface input parameters comprises:

receiving surface input parameters for a flat surface, wherein at least a portion of the surface input parameters includes a length and at least one width of the flat surface; and receiving a selected cell area.

7. The method of claim 6, wherein the step of selecting dot locations comprises:

dividing the flat surface into an integral number of cells, each cell including a non-overlapping cell area approximately equal to the selected cell area; and for at least a portion of the cells, randomly selecting one dot location in a respective one of the non-overlapping cell areas to generate the pseudo-random pattern of dots for at least a portion of the flat surface based on the surface input parameters.

8. The method of claim 1, wherein the step of receiving surface input parameters comprises:

receiving surface input parameters for a surface having a known shape, the known shape including a cylindrical surface and a flat surface, wherein at least a portion of the surface input parameters includes a radius of the cylindrical surface, a length of the cylindrical surface, at least one length of the flat surface, and at least one width of the flat surface; and receiving a selected cell area.

9. The method of claim 1, wherein the step of selecting dot locations comprises:

dividing the surface having the known shape into an integral number of cells, each cell including a non-overlapping cell area approximately equal to the selected cell area; and for at least a portion of the cells, randomly selecting one dot location in a respective one of the non-overlapping cell areas to generate the pseudo-random pattern of dots for at least a portion of the surface having the known shape based on the surface input parameters.

10. A program product comprising program instructions, embodied on a storage medium, that are operable to cause a programmable processor to:

receive surface input parameters for a surface having a known shape including at least one curved surface, wherein the surface input parameters mathematically describe the known shape with reference to a known coordinate system;

select dot locations for a pseudo-random pattern of dots on at least a portion of the surface based on the surface input parameters, wherein the pseudo-random pattern is a pattern that incorporates a randomness that overlays a systematic structure, wherein non-overlapping cell areas completely cover the surface, wherein one dot location is randomly selected anywhere within a respective one of at least a portion of the non-overlapping cell areas, so that there is no more than one dot patterned in any one of said portion of non-overlapping cell areas; and output coordinates for dot centers based on the dot locations.

11. The program product of claim 10, wherein instructions that are operable to cause a programmable processor to receive surface input parameters comprise instructions operable to cause the programmable processor to:

receive surface input parameters for a spherical surface, wherein at least a portion of the surface input parameters for the spherical surface includes a radius of the spherical surface; and receive a selected cell area.

12. The program product of claim 11, wherein instructions that are operable to cause a programmable processor to select dot locations comprise instructions operable to cause the programmable processor to:

perform a tessellation approximation for the spherical surface to divide the spherical surface area into an integral number of cells, each cell including a non-overlapping cell area approximately equal to the selected cell area; and for at least a portion of the cells, randomly select one dot location in a respective one of the non-overlapping cell areas to generate the pseudo-random pattern of dots for at least a portion of the spherical surface based on the surface input parameters.

13. The program product of claim 10, wherein instructions that are operable to cause a programmable processor to receive surface input parameters comprise instructions operable to cause the programmable processor to:

receive surface input parameters for a cylindrical surface, wherein at least a portion of the surface input parameters includes a radius of the cylindrical surface and a length of the cylindrical surface; and receive a selected cell area.

14. The program product of claim 13, wherein instructions that are operable to cause a programmable processor to select dot locations comprise instructions operable to cause the programmable processor to:

divide the cylindrical surface into an integral number of cells, each cell including a non-overlapping cell area approximately equal to the selected cell area; and for at least a portion of the cells, randomly select one dot location in a respective one of the non-overlapping cell areas to generate the pseudo-random pattern of dots for at least a portion of the cylindrical surface based on the surface input parameters.

15. The program product of claim 10, wherein instructions that are operable to cause a programmable processor to receive surface input parameters comprise instructions operable to cause the programmable processor to:

receive surface input parameters for a flat surface, wherein at least a portion of the surface input parameters includes at least two of at least one length of the flat surface, at least one width of the flat surface, an edge of flat surface, a distance from a center of a flat surface to an edge, and a distance from a center of the flat surface to vertex; and receive a selected cell area.

16. The program product of claim 15, wherein instructions that are operable to cause a programmable processor to select dot locations comprise instructions operable to cause the programmable processor to:

divide the flat surface into an integral number of cells, each cell including a non-overlapping cell area approximately equal to the selected cell area; and for at least a portion of the cells, randomly select one dot location in a respective one of the non-overlapping cell areas to generate the pseudo-random pattern of dots for at least a portion of the flat surface based on the surface input parameters.

17. The program product of claim 10, wherein instructions that are operable to cause a programmable processor to receive surface input parameters comprise instructions operable to cause the programmable processor to:

receive surface input parameters for a surface having a known shape, the known shape including a cylindrical surface and a flat surface, wherein at least a portion of the surface input parameters includes a radius of the cylindrical surface, a length of the cylindrical surface, at least one length of the flat surface, and at least one width of the flat surface; and receive a selected cell area.

18. The program product of claim 17, wherein instructions that are operable to cause a programmable processor to select dot locations comprise instructions operable to cause the programmable processor to:

divide the surface having the known shape into an integral number of cells, each cell including a non-overlapping cell area approximately equal to the selected cell area; and for at least a portion of the cells, randomly select one dot location in a respective one of the non-overlapping cell areas to generate the pseudo-random pattern of dots for at least a portion of the surface having the known shape based on the surface input parameters.

19. A program product comprising program instructions, embodied on a storage medium, that are operable to cause a programmable processor to:

receive surface input parameters for a surface having the known shape including at least one curved surface, wherein the surface input parameters mathematically describe the known shape with reference to a known coordinate system;

receive a selected cell area;

divide the surface having the known shape into an integral number of cells, each cell including a non-overlapping cell area approximately equal to the selected cell area, the non-overlapping cell areas completely covering the surface;

for at least a portion of the cells, randomly select one dot location anywhere within a respective one of the non-overlapping cell areas to generate a pseudo-random pattern of dots for at least a portion of the surface having the known shape based on the surface input parameters, wherein no more than one dot is generated in each non-overlapping cell area, and wherein the pseudo-random pattern is a pattern that incorporates a randomness that overlays a systematic structure; and output coordinates for dot centers based on the dot locations.

20. The program product of claim 19, wherein instructions that are operable to cause a programmable processor to receive surface input parameters for a surface having a known shape comprises instructions operable to cause the programmable processor to:

receive surface input parameters for at least one of a flat surface and a cylindrical surface, wherein the surface having a known shape includes at least one of the flat surface and the cylindrical surface, wherein at least a portion of the surface input parameters includes at least one of a radius of a cylindrical surface, a length of the cylindrical surface, at least one length of the flat surface, at least one width of the flat surface, an edge of the flat surface, a distance from a center of the flat surface to an edge, and a distance from a center of the flat surface to vertex.

* * * * *